(12) United States Patent
Schutte et al.

(10) Patent No.: US 10,878,277 B2
(45) Date of Patent: Dec. 29, 2020

(54) SHIP IDENTIFICATION SYSTEM AND METHOD

(71) Applicant: Nederlandse Organisatie voor toegepast-natuurwetenschappelijk onderzoek TNO, 's-Gravenhage (NL)

(72) Inventors: Klamer Schutte, 's-Gravenhage (NL); Sebastianus Petrus Van Den Broek, 's-Gravenhage (NL); Raoul Johan-Martijn Ten Hove, 's-Gravenhage (NL); Adam Wilhelmus Maria Van Eekeren, 's-Gravenhage (NL); Frank Bart Ter Haar, 's-Gravenhage (NL); Gerrit Van Antwerpen, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 53 days.

(21) Appl. No.: 16/349,442

(22) PCT Filed: Nov. 14, 2017

(86) PCT No.: PCT/NL2017/050735
§ 371 (c)(1),
(2) Date: May 13, 2019

(87) PCT Pub. No.: WO2018/088907
PCT Pub. Date: May 17, 2018

(65) Prior Publication Data
US 2019/0272442 A1 Sep. 5, 2019

(30) Foreign Application Priority Data
Nov. 14, 2016 (EP) .................................. 16198740

(51) Int. Cl.
*G06K 9/00* (2006.01)
*G06K 9/62* (2006.01)
(Continued)

(52) U.S. Cl.
CPC ......... *G06K 9/6202* (2013.01); *G06F 16/532* (2019.01); *G06F 16/5854* (2019.01);
(Continued)

(58) Field of Classification Search
CPC .. G06K 9/62; G06K 9/00; G06K 9/38; G06K 9/42; G06K 9/6202; G06K 9/00208;
(Continued)

(56) References Cited

U.S. PATENT DOCUMENTS

| | | | | |
|---|---|---|---|---|
| 4,422,166 | A | * | 12/1983 | Klein ...................... G01S 15/86 367/115 |
| 7,734,102 | B2 | * | 6/2010 | Bergeron ................... G06T 7/70 382/209 |

(Continued)

FOREIGN PATENT DOCUMENTS

| CN | 105975927 | A | * | 9/2016 |
| KR | 101379636 | B1 | * | 4/2014 |

OTHER PUBLICATIONS

Feb. 16, 2018 International Search Report and Written Opinion, PCT/NL2017/050735.
(Continued)

*Primary Examiner* — Mahendra R Patel
(74) *Attorney, Agent, or Firm* — Banner & Witcoff, Ltd.

(57) ABSTRACT

Identification of ships from camera images is performed by computing sets of reference silhouette images for respective reference ships for use to match the reference silhouette images with a camera image of an unidentified ship. A computer forms the set of the reference silhouette images for a reference ship is performed automatically by a processing (Continued)

system on the basis of at least one silhouette image of the respective reference ship. The computer generates a three dimensional model of the reference ship that represents distances of an outer surface of the reference ship to a plane on which the captured silhouette image has been mapped, the three dimensional model representing the distances as a function of position in said plane. A deck line of the reference ship is detected based on the camera image. The represented distances to the outer surface are set and/or adapted dependent on position in said plane relative to the detected deck line. The represented distances for positions in said plane below the detected deck line are set and/or adapted convergently toward a bow of the ship in the silhouette image. The reference silhouette images are generated by computing perspective projections of the three dimensional model onto image planes for respective viewpoints in a three dimensional array of viewpoints in ranges of distance relative to the reference ship, horizontal direction from the reference ship to the viewpoint and height relative to the reference ship and in the three dimensional model.

20 Claims, 3 Drawing Sheets (51) Int. Cl.
*G06F 16/583* (2019.01)
*G06F 16/532* (2019.01)
*G06K 9/38* (2006.01)
*G06K 9/42* (2006.01)
*G06T 5/00* (2006.01)
*G06T 7/60* (2017.01)

(52) U.S. Cl.
CPC ........... *G06K 9/00208* (2013.01); *G06K 9/38* (2013.01); *G06K 9/42* (2013.01); *G06T 5/002* (2013.01); *G06T 7/60* (2013.01); *G06K 9/00214* (2013.01); *G06K 9/00637* (2013.01)

(58) Field of Classification Search
CPC ............ G06K 9/00637; G06K 9/00214; G06F 16/532; G06F 16/583; G06F 16/5854; G06T 5/00; G06T 7/60; G06T 5/002
USPC .......................................................... 382/103
See application file for complete search history.

(56) References Cited

U.S. PATENT DOCUMENTS

| | | | |
|---|---|---|---|
| 8,170,272 B1* | 5/2012 | Joslin ................. | G06K 9/00637 382/100 |
| 2007/0035624 A1* | 2/2007 | Lubard .................. | G01S 17/89 348/144 |
| 2007/0269078 A1* | 11/2007 | Lee ...................... | G06K 9/3241 382/103 |
| 2007/0299338 A1* | 12/2007 | Stevick .................. | A61B 5/113 600/425 |
| 2008/0063237 A1* | 3/2008 | Rubenstein .......... | G06K 9/0063 382/103 |
| 2016/0342862 A1* | 11/2016 | Liu ......................... | G06T 17/05 |
| 2018/0052224 A1* | 2/2018 | Bretschneider ......... | G01S 13/90 |

OTHER PUBLICATIONS

Bundesministerium der Justiz: "Handbuch der Rechtsförmlichkeit, Teil B: Allgemeine Empfehlungen füdas Formulieren von Rechtsvorschriften; 1: Sprachliche Gestaltung von Gesetzen und Rechtsverordnungen", Handbuch der Rechtsförmlichkeit, Bundesanzeiger Verlag, Jan. 1, 2008, XP002686041, paragraph [0093].
Christian Ruwwe et al.: "Volumetrische Rekonstruktion von 3D-Modellen aus Schiffsbildern", Jan. 1, 2008, XP055365973, pp. 4-6.
Dateisystem Kamera et al.: "KEOD Klassifizierung mittels elektro optischer daten", Jan. 1, 2008, XP055366293.

* cited by examiner

SHIP IDENTIFICATION SYSTEM AND METHOD

CROSS-REFERENCE TO RELATED APPLICATIONS

This application is a U.S. National Stage application under 35 U.S.C. § 371 of International Application PCT/NL2017/050735 (published as WO 2018/088907 A1), filed Nov. 14, 2017, which claims the benefit of priority to Application EP 16198740.9, filed Nov. 14, 2016. Each of these prior applications is hereby incorporated by reference in its entirety.

FIELD OF THE INVENTION

The invention relates to a system and method for identifying ships.

BACKGROUND

The identification of a ship by a human operator conventionally involves the comparison of an observed outline of the ship with a set of photographs that show efferent ships. Attempts have been made to automate this process by a quantitative comparison of invariant moments (i.e. moments that are invariant under affine image transformations) computed for observed ships and for ships in the reference manual. However, such an approach suffers from inaccuracy due to loss of information in the reduction to moments and perspective deviations.

As an alternative the KEOD system is known. The KEOD system is described in an article titled "KEOD 1-16 Klassifizierung mittels elektro optischer daten" Datei system Kamera ET AL (EPO reference XP055366293). The KEOD system provides for the identification of ships using two methods: comparing contour lines from images with contour lines from complex 3D models or matching types and locations of 3D aspects such as the size and positions of masts or sensor systems. This approach has the disadvantage that construction of suitable 3D models and 3D database of ship details for this purpose involves considerable effort.

The construction of 3D models of ships from images is known from an article titled "Volumetrische Rekonstruktion von 3D-Modellen aus Schiffsbildern" by Christian Ruwwe ET AL (EPO reference XP055365973). Herein a plurality of images showing silhouettes of a ship from different directions are used to construct a 3D volume model by back projection.

SUMMARY

Among others, it is an object to provide for a more robust and reliable system and method for identifying ships.

A method of identifying ships from camera images according to claim 1 is provided. In this way a set of reference silhouette image may be generated automatically to ensure robust matching. Use of perspective projections rather than e.g. affine projections results in different shapes from different view points, which increases robustness. By way of example the array of view points may comprise viewpoints at at least two different heights, for at least five different distances, and a plurality of directions. Reference silhouettes for e.g. at least five hundred reference ships may be generated.

In an embodiment the image scales of the perspective projections are normalized so that a number of pixel positions along a horizontal line between the bow and the stern of the reference ship is the same in each reference silhouette image. In this way it is made possible that no reference dependent resizing is needed during matching, which speeds up matching.

The reference silhouette images may be run length encoded. This may be used to reduce the time needed for matching, because reference silhouettes can be retrieved faster or even kept in memory and because direct computation of difference from run length encoding may be used to save time.

In an embodiment the method comprises blurring transitions between areas in the reference silhouette images wherein the ship is visible and not visible respectively. This provides for increased matching robustness In an embodiment the method comprises use of a ship identification system comprising a camera, a storage system, a display device and a data processing system to perform said matching with the camera image of the unidentified ship, the method comprising the steps, executed by the data processing system, of receiving the camera image from the camera after capture of the camera image by the camera;

computing a query silhouette image from the camera image, the query silhouette image being a substantially binary image, with pixel values that have one of a first or second level, indicating visibility of a ship and absence of visibility of the ship respectively, and pixel values having values other than the first or second level at most for pixel positions at transitions between image areas with pixels having the first or second level;

retrieving the reference silhouette images from the storage system;

computing values of a measure of difference between the query silhouette image and each of the reference silhouette images;

selecting at least one of the reference ships based on the values of a measure of difference;

causing the display device display an identification of the at least one of the reference ships.

Use of a set of reference silhouette images from different perspectives increases robustness of the computation of the measure of difference. Preferably, the query silhouette image is normalized in size so that a number of pixel positions along a horizontal line between the bow and the stern of the query silhouette image is the same as for the reference silhouette images.

In an embodiment the method comprises application of blurring to transitions in the query silhouette image between areas where the unidentified ship is indicated to be visible and not visible respectively. In an embodiment values of a measure of difference for the query silhouette image are computed with applied edge blurring. This provides for increased matching robustness.

In an embodiment the method comprises run length encoding of the query silhouette image and the reference silhouette images and computing the measure of difference directly from the run length encoded images. This increases matching speed.

In an embodiment, the computation of the measure of difference comprises computing an effect, in the measure of difference, of blurring transitions in the query silhouette image and/or the reference silhouette images between areas where the unidentified ship or the reference ship is indicated to be visible and not visible respectively. This increases robustness without requiring pre-blurred silhouette images.

A ship identification system configured to apply the method is provided.

BRIEF DESCRIPTION OF THE DRAWING

These and other objects and advantageous aspects will become apparent from the following description of exemplary embodiments, by reference to figures, wherein.

DETAILED DESCRIPTION OF EXEMPLARY EMBODIMENTS

Figure 1:
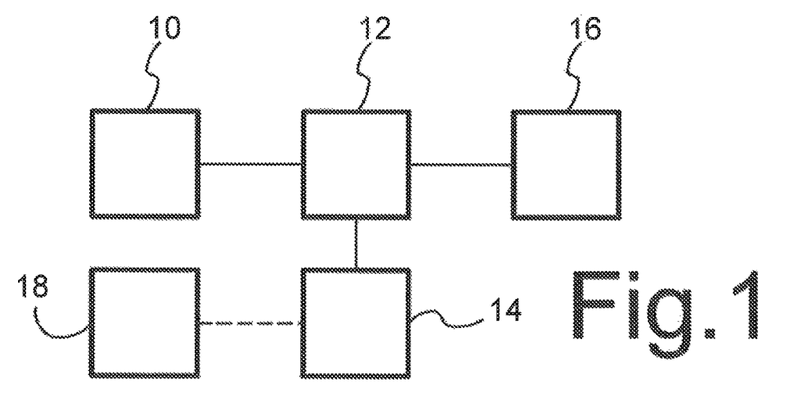
FIG. 1 shows a ship identification system

FIG. 1 shows an embodiment of a real-time ship identification system. The real-time system comprises a camera 10, a data processing system 12, a storage system 14 and a display device 16. Data processing system 12 is coupled to camera 10, storage system 14 and display device 16. Storage system 14 may consist of a local storage device, or it may comprise a remote storage device coupled to data processing system 12 via a network. The storage device may be a solid state memory device for example, or a hard disk device.

In storage system 14 electronic representations of a set of reference silhouette images for a plurality of different reference ships is stored, the reference silhouette images comprising, for each of the reference ships, reference silhouette images corresponding to a 3 dimensional array of different viewpoints at different distances, camera heights and horizontal directions of the viewpoints relative to the reference ship. For example five different distances, ten different camera heights and a hundred and eighty different horizontal directions may be used. As used herein, a silhouette image is a binary image or at least a substantially binary image. A binary silhouette image is an image with pixel values that have one of a first or second level, indicating visibility of a ship and absence of visibility of the ship respectively. A substantially binary image is an image with pixels that have the first and second level homogeneously in first and second image areas respectively, and pixels that have other than the first or second level at most at pixel positions at transitions between the first and second image areas.

For each reference ship, a plurality of the electronic representations of the set of reference silhouette images are computed from a single image of the reference ship, or from a smaller number of images of the reference ship than the number of stored reference silhouette images for the reference ship in storage system 14. Data processing system 12 may be used to perform the computation of the set of reference silhouette images, or this computation may be performed off-line by means of a further processing system (not shown) and downloaded to storage system 14. The further processing system may be a detachable part of data processing system 12.

Figure 2:
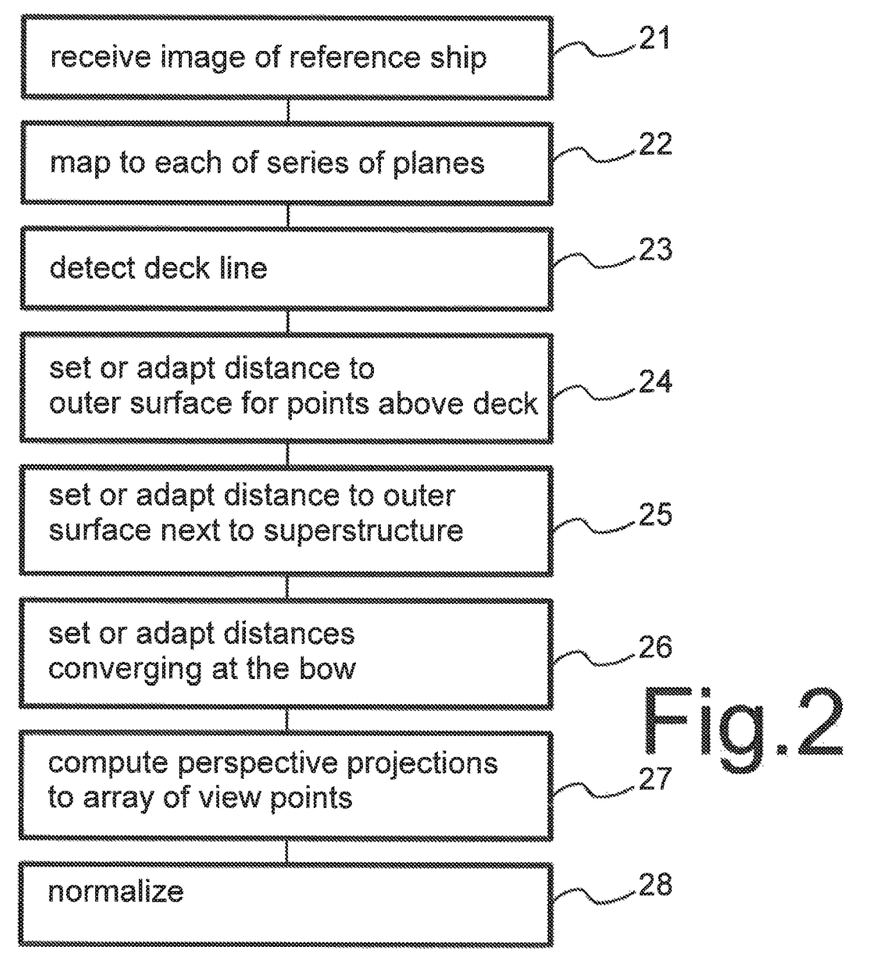
FIG. 2 shows a flow chart of generating an array of reference images from a single image FIG. 3a,b show 3D representations of model adjustments

FIG. 2 shows a flow chart of generating an electronic representation of an array of reference silhouette images of a reference ship from a single image of that reference ship by a processing system (data processing system 12 or a further processing system 18, such as a general purpose computer, which is not part of the real-time ship identification system). This processing system may comprise a stored program for controlling the steps executed by the processing system, and where it is disclosed in the following that the processing system performs steps, this means that the program contains instructions to make the processing system perform these steps.

The steps of the flow-chart are executed for a plurality of reference ships. In a first step 21, the processing system receives or retrieves a single camera image of a reference ship. The camera image may be a silhouette image or may be converted to a silhouette image, i.e. an image with pixel values that indicate whether or not the reference ship is visible in the image at the location of the pixel or not, an otherwise encoded image, or a representation of a path of the silhouette e.g. in the form of a sequence of coordinate pairs of successive points along the silhouette, a sequence of step direction codes (e.g. coding for to the right, up, to the left down) of steps along the silhouette, run length coding of such sequences, line or curve parameters of lines of curves in the path. Methods of conversion to a silhouette image will be described in the context of FIG. 4. The pixel values may be values from a binary range, or a broader range that may represent additional information. Optionally, the processing system converts the camera image to such a binary silhouette image or more value silhouette image. In an embodiment, input from a user may be used to compute the silhouette query image, e.g. using input from the user that indicates pixel locations on a contour of the observed reference ship in the camera image. User input or an automated computation may also be used to indicate on which side of the image the bow of the reference ship is located.

In the following steps the processing system automatically derives a three dimensional model from the camera image. The three dimensional model represents at least where points on an outer surface of the reference ship are present in a three dimensional space. The three dimensional model may be a model that defines visibility value and left and right distance values from a vertical central plane from the bow to the stern of the ship, the visibility values and left and right distance values being defined by the model as a function of position in the central plane. This will be referred to as a left-right distance model. In such a left-right distance model the left and right distance values represent the distance of the outer surface of the ship from the central plane and the visibility defines whether such a surface is present at all (or at least whether it is visible). In an embodiment, the left and right distance values are defined to be equal. In this embodiment a single defined function of position in the central plane may be used to define the equal left and right distant values. The distance values may be encoded in a similar way as a 2d image or set of 2d images, for example as a 2d matrix of distance values, of the equal left and right distance values, or separate 2d matrix of distance values. Instead encoded values of such images may be used using know image encoding methods. Alternatively, an other type of three dimensional model may be used, For example, the three dimensional model may be a voxel model, representing voxel values of voxels in a three dimensional matrix of voxels, each voxel value representing whether the voxel is in the modelled reference ship or not, i.e. whether the voxel is void of the reference ship or not. As another example, the three dimensional model may be polygon mesh surface model, wherein the surface of the ship is modelled e.g. by means of a set of surface points and polygons with these surface points as corners. In fact, the left-right distance model may be used as such a surface model, using the distance values for different visible positions on the central plane to define surface points and 3D polygons in one to one relation with projected polygons on the central plane.

In a second step 22 the processing system maps the silhouette reference image onto the model. In the case of a left right distance model the silhouette image is used to set the visibility values as a function of position in the central plane. In an embodiment, the left and right distance values may be assigned predetermined initial values, or they may be set in subsequent steps. When a voxel model is used, the silhouette image is initially mapped onto each of a discrete or continuous series of planes in the three dimensional model that are parallel to the central plane. The processing system effectively sets points in the central plane according to the indication whether or not the reference ship is visible at corresponding points in the camera image and extends this to a range of planes parallel to the central planes, over a range of depths in the direction perpendicular to the central plane.

Figure 3A:
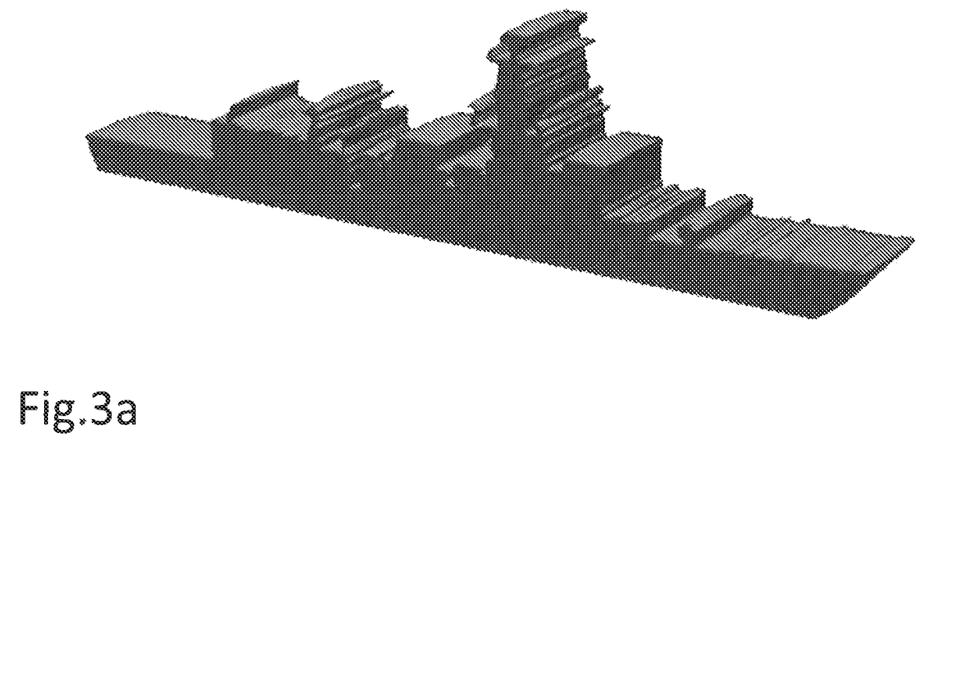

FIG. 3a illustrates an exemplary result of second step 22. Optionally, the position and scale of the mapping may be adapted so that the fore-aft length of the reference ship in each plane has the same predetermined normalized value and the reference ship is positioned at a predetermined normalized position. In terms of the voxel model a "void voxel value" is used to indicate space void of the reference ship at all voxels, except over a limited predetermined range of depths, where the pixel values of each pixel that indicates the presence of the reference ship is extended to voxels over the range of depths.

In a third step 23, the processing system detects a deck line of the reference ship. The deck line is a line between the fore and aft ends of the ship, which coincides with parts of the silhouette and is otherwise not crossed by parts of the silhouette between the fore and aft ends of the ship. Typically, the deck line is straight and horizontal, with at most some bending near the ends of the ship, over less than half of the length between the fore and aft ends, The processing system may be configured to detect the deck line by detecting substantially horizontal edges in the silhouette and extending the detected edges over the fore-aft length.

Alternatively, the deck line may be detected by selecting substantially horizontal top side parts of the silhouette adjacent the fore and aft ends of the silhouette (e.g. with a slope of at most thirty degrees with respect to the horizontal) and by using an interpolation between these parts as the deck line.

Alternatively, the deck line may be detected by selecting the deck line as a horizontal line at a height where a count of pixels associated with that height within the silhouette meets a predetermined criterion. For example, the criterion may be that the height is the lowest height at which the fraction of pixels between the fore and aft ends of the silhouette that lie within the silhouette at that height is below a predetermined threshold. The fraction may be 0.75 for example. Alternatively, the criterion may be that the height is the lowest height at which the fraction of pixels between the fore and aft ends of the silhouette that lie within the silhouette at or below that height and above a bottom height of the silhouette is below a predetermined threshold. These alternatives may comprise counting, for each of a number of heights, how many pixels are within the silhouette.

Another alternative for detecting the deck line comprises performing a search for a set rectangles that best fits the silhouette, wherein the set of rectangles contains a lower rectangle that extends from the fore end to the aft end of the silhouette. In this alternative, the top edge of the lower rectangle of the best fitting set may be used as the deck line. The set of rectangles, may contain further rectangles on top of the lower rectangle. The search may adapt the width and length of the rectangles and optionally their number up to a predetermined maximum number, to determine a combination of rectangles that minimizes the area of discrepancy in the captured image inside the silhouette that is not covered by the rectangles and outside the silhouette that is covered by the rectangles. Instead of, or in addition to rectangles, other polygons may be used. As an alternative, the deck line could be determined based on ab indication in a user input.

In subsequent steps, the processing system adapts the model by reducing the left-right distance of the modelled outer surface of the ship to the central plane at least partly dependent on the position of the detected deck line. When the left-right distance model is used, this may be done by setting or adjusting the left and right distance values, or a single value that represents both, dependent on whether the positions on the central plane to which they apply or above or below the detected deck line. Similarly, when a voxel model is used, voxel values may be set to void values in sub-ranges of points of depths in the direction perpendicular to the central plane.

Figure 3B:
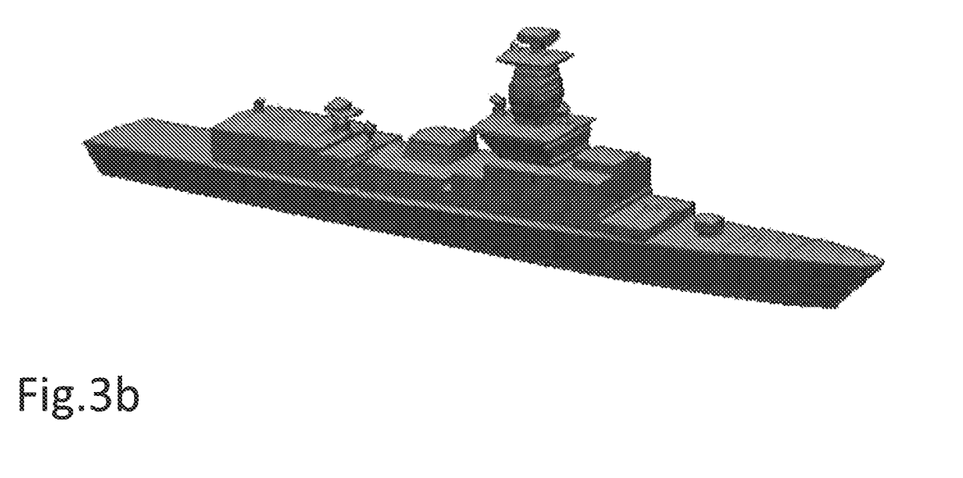

FIG. 3a and FIG. 3b illustrate the model before and after these steps respectively. In an embodiment, equal sized adjustments may be made to the left and right distances. In the left-right distance model the left and right distance values or the distance value that represents both are set or adapted. When a voxel model is used, lower and higher sub-ranges from the lowest and highest of the range of depths may be set to void values. The removal is applied selectively, dependent on the position in the central plane. The amount of distance adjustment may be predetermined, or dependent on the position in the plane on to which the camera image is mapped and/or on features of the camera image.

In a fourth and fifth step 24, 25 the processing system removes the indication that points in the reference ship are present above the deck line in the sub-ranges. In fifth step 25, the size of the sub-ranges is dependent on detected structures. In sixth step 26, the size of the sub-ranges is dependent on position along the fore-aft line of the reference ship. Although fourth to sixth steps are described in an exemplary sequence, it should be appreciated that this sequence may be changed.

In fourth step 24 adjustments of the distance of the outer surface to the central plane with a predetermined size may be used, or predetermined fractions of the size of the fore-aft length. In this step the processing system removes the indication that points in the reference ship are present above the deck line from lowest and highest sub-ranges of the depth range with the predetermined size. When the left right distance model is used, the distance values are adjusted. When the voxel model is used, voxels in these sub-ranges are assigned void voxel values. This step is based on the assumption that structures above the deck line are narrower than the width of the reference ship at the deck line.

In fifth step 25, the processing system detects parts of the silhouette that are visible above the deck line and determines the length of the detected parts along the fore-aft line of the reference ship in the image or the 3D model. If it detects such parts, the processing system adjusts the distance of the outer surface to the central plane for the detected parts dependent on their detected length, e.g. to the length multiplied by a predetermined factor such as 0.5. Optionally, the processing system does so only for parts with a length that is less than a predetermined threshold. Preferably, the processing system uses equal sizes for the left and right distances, the sizes being selected so that the remaining width of the 3D structure that corresponds to the part in the depth direction is at most as large as its length. In an embodiment, the length and width are made equal, but not wider than the width resulting from step 24. When the left-right distance model is used, the distance values are adjusted. When the voxel model is used, the indication that points in the reference ship that are present above the deck line are set to void values from length dependent lowest and highest sub-ranges of the depth range where such a structure is present.

Optionally, the processing system is configured to input control information from a user interface, and to select between different ways of setting sub-ranges from the range of depths to void values under control of this control information. For example, the processing system may provide for a method to set a sub-range of distances of which the center lies in the plane on to which the camera image is mapped. In this case, the processing system may be configured to select, under control of this control information, between using this method, and the method described for fifth step 25 under, which sets lower and higher sub-ranges. Thus for example the placement of pairs of funnels may be accounted for.

In sixth step 26, the distance of the outer surface of the ship to the central plane is adjusted dependent position along the fore-aft direction. The distance between the outer surface and the central plane is set to increase from zero with position from the bow to the stern of the ship. This is based on the assumption of convergence at the bow. In an embodiment, a distance according to a predetermined function of position on a normalized scale of bow to stern position may be used. The distance may be kept constant in a range of positions along the fore-aft line at a distance from the bow that is a predetermined fraction of the length of the silhouette, or from a for-aft position where a structure with at least a predetermined length is present above the deck line.

When the left-right distance model is used, this adjustment may be performed by adjusting the distance values, or the single distance value. When the voxel model is used, voxels may be set to void values correspondingly. In an embodiment, the distance adjustment may be applied irrespective of position relative to the deck line, but preferably it is applied to locations below the deck line only.

In a further embodiment, sixth step 26 may also comprise adjustment of the distance of the outer surface of the ship to the central plane is dependent position along top bottom direction, at least below the deck line. In an embodiment, a distance according to a predetermined function of position on a normalized scale of deck line to bottom position may be used.

FIG. 3b shows an exemplary result after fourth to sixth steps 24-26. As noted, the described order of these steps may be changed. Sixth step 26 may be part of second step 22, to set the initial distances between the outer surface of the modelled ship and the central plane. Optionally, user selectable configurations may be used to control the adjustments in the different steps. For example, the functions that are used to define the hull width at the deck-line as a function of position along the fore-aft and/or top-bottom direction may be user configurable. Similarly, the left and right distances in fourth step 24 may be configurable and different from one another, e.g. for a model of an aircraft carrier. In addition to models based on captured images that are generated in the described way, models may be used that are based on other information, such as a ship's drawings.

In seventh step 27, the processing system uses the three dimensional model produced in the preceding steps to compute information that represents 2D reference silhouette images of the reference ship from a 3 dimensional array of different viewpoints, by perspective projections onto an image plane. For each of the view points a corresponding perspective projection is computed. The perspective projection may be performed directly from the left-right distance model, by projecting surface points defined by the left and right distance values for different positions on the central plane. Alternatively, the left-right distance model may be converted to another 3D model such as a polygon mesh surface model or a voxel model and the projection may be performed using that 3D model. Methods of computing perspective projections of 3D models such polygon mesh surface models and voxel model s are known per se.

Optionally, the processing system executes an eighth step 28 wherein adjusts the image position and scale used in the projection of the 2D reference silhouette images so that the fore-aft length of the reference ship in terms of pixel positions along a horizontal line between the bow and the stern in the reference silhouette image has the same predetermined normalized value in each 2D reference silhouette image and the reference ship is positioned at a predetermined normalized position in each 2D reference silhouette image. A normalized length value of 100 pixels may be used for example. The position may be selected so that the bow at the deck line has a predetermined horizontal and vertical position. The processing system assigns first level pixel values at pixel locations where voxels are projected that correspond to voxels wherein the reference ship is present and second level pixel values at pixel locations where no such where voxels are projected.

In an embodiment, the processing system assigns levels between the first and second level to pixel locations where both voxels are projected wherein the reference ship is present and voxels where the reference ship is not present, e.g. in proportion to the fraction of voxels wherein the reference ship is present. This results in a substantially binary silhouette image.

In an embodiment the processing system blurs the reference image by convoluting it with a filter kernel, such as a Gaussian filter kernel, e.g. with a standard deviation of 0.75 pixel. This form of filtering does not affect the pixel values in the homogeneous image areas, but slightly blurs the transitions between such areas.

In an embodiment the processing system computes a plurality of reference silhouette images using perspective projections onto image planes with different pixel rasters that differ by sub-pixel sized position shifts. In an alternative embodiment, the projected silhouette images are used to generate different sub-pixel sized position shifted image versions.

In an embodiment, the processing system encodes the information representing the resulting reference silhouette images by run length encoding, i.e. an encoding indicating the numbers of successive pixels at which the same pixel value is present rather than individual ones of these pixels. In most cases run lengths of more than one pixel occur only for the first and second levels, and levels in between have a run length of one. This makes it possible to use an efficient run length code. In an embodiment the encoding omits the run lengths of the first level, i.e. excluding encoding of run length of pixels where the ship is visible.

Alternative representations of reference silhouette images include a 2d matrix of pixel values (e.g. binary or substantially binary images), and encoded versions of such a 2d matrix such as a JPEG, PNG or GIF encoded image.

The processing system performs these steps for each of a plurality of reference ships.

Representations of the reference silhouette images are stored in storage system 14 in association with identifications of the reference ships of the images from which the reference silhouette images have been derived. Each identification of a reference ship may be associated with a plurality of generated reference silhouette images, or equivalently, each generated reference silhouette image may be associated with an identification of reference ship, e.g. with a unique identifier of that reference ship.

Figure 4:
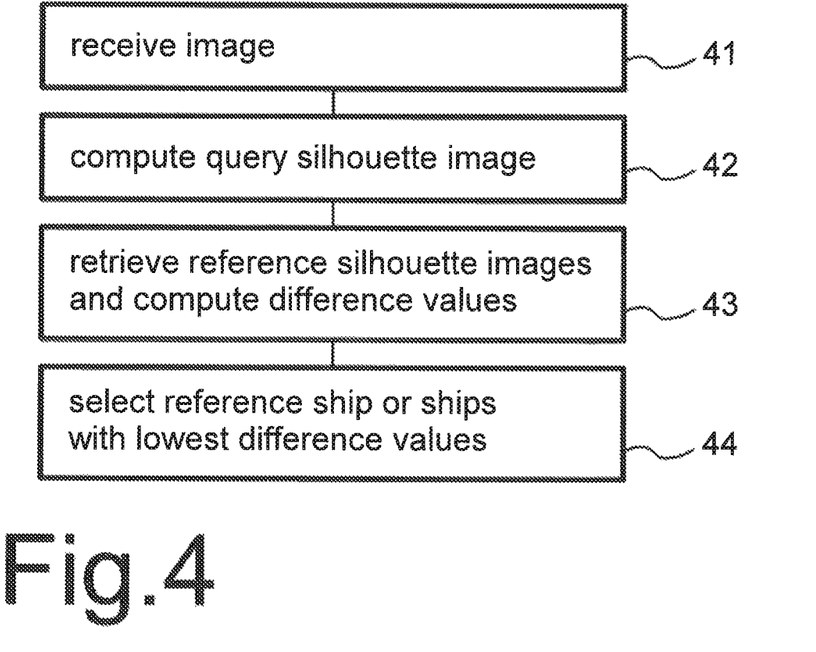
FIG. 4 shows a flow chart of ship identification

FIG. 4 shows a flow chart of ship identification performed by data processing system 12. Data processing system 12 may comprise a stored program for controlling the steps executed by the processing system 12. Where it is disclosed in the following that the data processing system 12 performs steps, this means that the program contains instructions to make the data processing system 12 perform these steps, as for FIG. 2. The data processing system 12 reduces a query image to a mostly two-level query silhouette image and computes differences between the query silhouette image and the reference silhouette images generated for the 3D array of different viewpoints for each of the reference ships.

In a first step 41, data processing system 12 receives an image captured by camera 10. This image will be referred to as the query image.

In a second step 42, data processing system 12 computes a query silhouette image from the query image. Initially, the query silhouette image may be a strictly binary image. A strictly binary query silhouette image may be generated containing first level pixel values for pixels at which the observed ship is determined to be visible and second level pixel values for pixels where the observed ship is determined not to be visible, as in the generated reference silhouette images.

In an embodiment, second step 42 may comprise using input from a user to determine the circumference of the silhouette. In an embodiment of second step 42 data processing system 12 causes display device 16 to display the query image, and data processing system 12 receives an input from an operator indicating pixel locations on a contour of the observed ship in the query image. Alternatively, data processing system 12 may execute a segmentation algorithm to generate the query silhouette image automatically.

Based on the input or the segmentation result data processing system 12 assigns the first and second level to pixels within and outside the observed ship respectively. Second step 42 may have a sub-step wherein data processing system 12 determines a resizing factor, a position shift, and optionally a rotation of the query silhouette image that make the size, position and optionally orientations of the ship in the query silhouette image match a predetermined target size (e.g. number of pixel positions along a horizontal line between the bow and the stern) and position and optionally a target orientation. The target size and position preferably correspond to the normalized values of the size and position in the 2D reference silhouette images. A normalize length value of 100 pixels may be used for example.

Data processing system 12 may assign the first and second levels to pixels at positions according to the resizing factor and optionally the position shift and rotation. Alternatively, data processing system 12 may transform the query silhouette image in accordance with the size etc. as in the original camera image. Alternatively, one or more of the resizing, shifting and rotating may be applied in third step 43.

In an embodiment computation of the query silhouette image comprises blurring transitions between the first and second levels, using other levels for pixels at the transition between the two levels. Thus a substantially binary query silhouette image is realized like the reference silhouette images. Data processing system 12 may perform blurring for example by convolution with a Gaussian filter kernel with a standard deviation of 0.75 pixels. In an embodiment data processing system 12 computes a plurality of blurred query silhouette images for different sub-pixel size position shifts.

In an embodiment, data processing system 12 encodes the information representing the query silhouette image by run length encoding.

In a third step 43 data processing system 12 retrieves representations of the reference silhouette images from storage system 14 and data processing system 12 computes a measure of difference between the query silhouette image and each of the reference silhouette images. The measure of difference may be computed as a sum of squares of the differences between the pixel values at corresponding pixels positions in the query silhouette image and the reference silhouette image. Instead of squares other single sign functions of the difference may be used, such as the absolute value etc. In embodiments wherein the query silhouette image does not account for the resizing factor, position shift, and optional rotation, the resizing factor, position shift, and optional rotation may be used in the selection of pixel positions for which the differences are determined.

In an embodiment of third step 43, data processing system 12 may use a weighted sum, using weight dependent on position in the image. Relatively smaller weights may be used for positions near the waterline than for positions higher up, or for positions below the deck line in the query silhouette image than for positions higher up. The weights may be defined as a predetermined function of distance from a detected water line in the query image and/or as a predetermined function of distance from a detected deck line in the reference image and/or in the query image.

In an embodiment data processing system 12 may compute the measure of difference for each of a plurality of relative shifts of the query silhouette image and the reference silhouette image (e.g. shifts of zero and plus and minus one pixel position) in third step 43. In embodiment a larger range of positions is used in the vertical direction than in the horizontal direction, because ships have been found to produce larger variation in the vertical direction.

In the embodiment wherein a plurality of blurred query silhouette images for different sub-pixel size position shifts have been generated, data processing system 12 may compute the measure of difference for each of these images in third step 43. In the embodiment wherein reference silhouette image versions for pixel rasters with different sub-pixel shift are available data processing system 12 may compute the measure of difference between the query silhouette image and each of these versions in third step 43. In each case data processing system 12 selects, for each reference ship the lowest measure of difference for the different query silhouette images or reference silhouette images for different position shifts.

As will be appreciated the square of the difference between pixel values in the reference silhouette image and the query silhouette image will be zero or have a first value at pixel position where the pixel values have the first or second values. Therefore, for such pixels, it suffices to count pixels where the levels differ. Only for pixel values other than the first and second level a more detailed computation is needed.

In the embodiment wherein run length encoded query silhouette images and run length encoded reference silhouette images are available, data processing system 12 preferably computes the measure of difference directly from the run length encoded data. Herein "directly" means that values corresponding to sums of squares or other functions of pixel value differences are computed for runs of pixel positions directly, without computing differences for all individual pixels in the runs. This makes it possible to realize an efficient computation of the measure of difference. In most cases run lengths of more than one pixel occur only for the first and second level, if encoded. For these only run length differences need to be determined, rather than value differences. Only for the transitions between the levels differences between pixels may need to be computed. In the embodiment wherein run lengths of pixels where the ship is visible are not encoded, differences with these run lengths are not counted.

Although embodiments have been described wherein the silhouette images are blurred before the computation of the measure of difference, it should be noted that in alternative embodiments the blurring may be effectively performed as part of the computation of the measure of difference, using silhouette images that have not been blurred. The contribution of blurring to the measure of difference may be approximated by a function of the pixel distance between the ends of runs encoded by the run length encoding of the silhouette images. This function may be represented by a stored table of function values for different pixel distances. Data processing system 12 may compute these contributions by applying this function to the pixel distances, e.g. by looking up table values based on the pixel distance.

In an embodiment the run length encoded may be expressed in terms of 16-byte words for use as operand of a SIMD processor (Single Instruction Multiple Data processor), or more specifically AVX operand words (advanced vector extension words, which may be processed by Intel compatible processors), each word representing 16 pixels of a silhouette image. Aligned coding may be used, wherein the encodings of the reference silhouette image and the query silhouette image use the same groups of pixels for the SIMD words. As a result, the computation of the measure of difference may be implemented using operations per group.

The computations of the measure of difference with different reference silhouette images may be performed in parallel.

In a fourth step 44 data processing system 12 automatically selects the reference silhouette image having the lowest difference and uses the identifier of the reference ship associated with that reference silhouette to identify the observed ship.

Alternatively, data processing system 12 selects a number of N (N>1) reference ships. Data processing system 12 may determine, for each reference ship, the minimal values of the values of the measure of difference computed using the query silhouette image and the different reference silhouette images of the reference ship. Subsequently, data processing system 12 may rank the different reference ships in order of lowest size of the minimal values for the reference ships. Data processing system 12 may display reference silhouette image with the minimal value of the measure of difference for the N reference ships with the lowest minimal measure of difference, combined with identifiers of these reference ships, for use by an operator to decide the identification of the observed ship.

In another embodiment, an identification of the ship with a reference silhouette image with the minimal value of the measure of difference for the N reference ships with may be sent to another system for further processing, e.g. for generating a communication signal to the ship or for generating an alert.

Although examples have been described wherein one set of reference silhouette images is generated for a ship, it should be appreciated that a plurality of sets of reference silhouette images may be generated from respective different 3D models for a same ship. In this case identification of this ship may be performed using a reference silhouette image from any of the sets of reference silhouette images. Thus, for example, shape differences of a container ship with and without cargo may be accounted for.

Although a system and method for identifying ships has been described, it should be appreciated that a similar method and system may be used for identifying other types of object instead of the ships, from images and in particular silhouette images. From a captured silhouette image of a reference object a computer computes a plurality of reference silhouette image as the object will be perceived from different viewpoints in a 3D arrays of viewpoints, e.g. at different distances between the viewpoint and the object, different directions from the object to the viewpoint and optionally different height of the viewpoint. The plurality of reference silhouette images may be performed by computing perspective projections of a 3 dimensional model for the different viewpoints.

The three dimensional model represents at least where points on an outer surface of the reference object are present in a three dimensional space. In particular the three dimensional model represents distances of the outer surface to a plane on which the captured silhouette image has been mapped. Preferably the plane is a central cross-section plane through the modelled object, and in additionally it is preferably vertical. A left-right distance model that defines distance values, a voxel model or a polygon mesh surface model may be used for example. The computer maps the captured silhouette image onto the central plane of the three dimensional model. The computer detects one or more features of the captured silhouette and sets and/or adapts the represented distances to the central plane in the three dimensional model based on the one or more detected features of the captured silhouette image and/or dependent on position (preferably position along a normalized silhouette scale). In the case of a ship the deck line is an example of such a detected feature, but alternatively other features may be used for other types of objects such as the line at the bottom of car windows, the border between the wings and body of an aircraft viewed from below etc. The way in which the computer sets and/or adapts the represented distances to the central plane may be configurable. The computer may provide for user selection of the configuration.

The invention claimed is:

1. A method of identifying ships from camera images, comprising computation of sets of reference silhouette images for respective reference ships for use to match the reference silhouette images with a camera image of an unidentified ship, wherein the computation of the set of reference silhouette images for each respective reference ship is performed automatically by a processing system, the method comprising the steps, performed by the processing system, of forming a three dimensional model of the respective reference ship that represents distances of an outer surface of the reference ship to a plane on which a captured silhouette image has been mapped, the three dimensional model representing the distances as a function of position in said plane;

detecting a deck line of the reference ship from the captured silhouette image;

setting and/or configuring the represented distances to the outer surface dependent on position in said plane relative to the detected deck line, the distances to the outer surface above the deck line being reduced relative to distances to the outer surface below the deck line;

setting and/or configuring the represented distances for positions in said plane below the detected deck line convergently toward a bow of the ship in the silhouette image;

generating the reference silhouette images by computing perspective projections of the three dimensional model onto image planes for respective viewpoints in a three dimensional array of viewpoints in ranges of distance relative to the reference ship, horizontal direction from the reference ship to the viewpoint and preferably also height relative to the reference ship in the three dimensional model.

2. The method according to claim 1, comprising detecting a part of the captured silhouette that is visible above the deck line in the captured image, determining the length of the detected part along the fore-aft line of the reference ship and adjusting the distance of the outer surface to the central plane by an amount equal to a predetermined factor times said length where said part is present.

3. The method according to claim 1, wherein only a single captured silhouette image of the ship is used to form the three dimensional model of the ship.

4. The method according to claim 1, wherein the image scales of the perspective projections are normalized so that a number of pixel positions along a horizontal line between the bow and the stern of the reference ship is the same in each reference silhouette image.

5. The method according to claim 1, wherein the reference silhouette images are run length encoded.

6. The method according to claim 1, comprising blurring transitions between areas in the reference silhouette images wherein the ship is visible and not visible respectively.

7. The method according to claim 1, wherein said plane is a central fore-aft plane of the modeled ship and the represented distances to the outer surface for each position in said plane on opposite sides of the plane are set or configured equally.

8. The method according to claim 1, comprising use of a ship identification system comprising a camera, a storage system, a display device and a data processing system to perform said matching with the camera image of the unidentified ship, the method comprising the steps, executed by the data processing system, of receiving the camera image from the camera after capture of the camera image by the camera;

computing a query silhouette image from the camera image, the query silhouette image being a substantially binary image, with pixel values that have one of a first or second level, indicating visibility of a ship and absence of visibility of the ship respectively, and pixel values having values other than the first or second level at most for pixel positions at transitions between image areas with pixels having the first or second level;

retrieving the reference silhouette images from the storage system;

computing values of a measure of difference between the query silhouette image and each of the reference silhouette images;

selecting at least one of the reference ships based on the values of a measure of difference.

9. The method according to claim 8, comprising causing the display device to display an identification of the at least one of the reference ships.

10. The method according to claim 8, comprising application, by the data processing system, of blurring transitions in the query silhouette image between areas where the unidentified ship is indicated to be visible and not visible respectively, and to compute values of a measure of difference for the query silhouette image with applied edge blurring.

11. The method according to claim 8, comprising run length encoding of the query silhouette image and the reference silhouette images and computing the measure of difference directly from the run length encoded images.

12. The method according to claim 11, wherein the computation of the measure of difference comprises computing an effect, in the measure of difference, of blurring to transitions in the query silhouette image and/or the reference silhouette images between areas where the unidentified ship or the reference ship is indicated to be visible and not visible respectively.

13. The method according to claim 8, comprising weighting contributions of different pixels in the measure of difference dependent on a distance between the pixels to a waterline and/or a deck line in the query silhouette image and or the reference silhouette image.

14. A ship identification system, comprising a camera, a storage system, a display device and a data processing system, the data processing system coupled to the camera, the storage system and the display device, wherein the data processing system comprises a program of instructions for the data processing system to cause the data processing system to receive an image captured by the camera;

compute a query silhouette image from the image captured by the camera, the query silhouette image being a substantially binary image, with pixel values that have one of a first or second level, indicating visibility of a ship and absence of visibility of the ship respectively, and pixel values having values other than the first or second level at most for pixel positions at transitions between image areas with pixels having the first or second level;

apply edge blurring to the query silhouette image to obtain a query silhouette image with applied edge blurring;

retrieve reference silhouette images for a plurality of reference ships from the storage system;

compute values of a measure of difference between the query silhouette image with applied edge blurring and each of the reference silhouette images;

select at least one of the reference ships based on the values of a measure of difference; and cause the display device display an identification of the at least one of the reference ships.

15. The ship identification system according to claim 14, wherein the query silhouette image with applied edge blurring and the reference silhouette images are run length encoded images, and the program comprises instructions to cause the data processing system to compute the measure of difference directly from the run length encoded images.

16. The ship identification system according to claim 15, wherein the program comprises instructions to cause the data processing system to compute the measure of difference by computing an effect, in the measure of difference, of blurring transitions in the query silhouette image with applied edge blurring and/or the reference silhouette images between areas where the unidentified ship or the reference ship is indicated to be visible and not visible respectively.

17. A non-transitory machine readable medium comprising a program of instructions for performing the method of claim 1 when executed by the processing system.

18. A method of identifying a ship, the method comprising receiving an image captured by a camera, wherein said camera, a storage system, and a display device are coupled to a data processing system, and wherein said data processing system executes steps of:
  computing a query silhouette image from the image captured by the camera, the query silhouette image being a substantially binary image, with pixel values that have one of a first or second level, indicating visibility of a ship and absence of visibility of the ship respectively, and pixel values having values other than the first or second level at most for pixel positions at transitions between image areas with pixels having the first or second level
  applying edge blurring to the query silhouette image to obtain a query silhouette image with applied edge blurring;
  retrieving reference silhouette images for a plurality of reference ships from the storage system;
  computing values of a measure of difference between the query silhouette image with applied edge blurring and each of the reference silhouette images;
  selecting at least one of the reference ships based on the values of a measure of difference; and
  causing the display device display an identification of the at least one of the reference ships.

19. The method of claim 18, wherein the query silhouette image with applied edge blurring and the reference silhouette images are run length encoded images, and the values of the measure of difference are computed directly from the run length encoded images.

20. The method of claim 19, wherein the values of the measure of difference are computed by computing an effect, in the measure of difference, of blurring transitions in the query silhouette image with applied edge blurring and/or the reference silhouette images between areas where the unidentified ship or the reference ship is indicated to be visible and not visible respectively.

* * * * *